Dec. 14, 1965   B. E. ABBOTT, JR   3,223,959
SEAL AND CONNECTOR ASSEMBLY
Filed Sept. 26, 1963

INVENTOR.
BENNETT E. ABBOTT, Jr.
BY
ATTORNEYS

United States Patent Office 3,223,959
Patented Dec. 14, 1965

3,223,959
SEAL AND CONNECTOR ASSEMBLY
Bennett E. Abbott, Jr., Richardson, Tex., assignor to Sun Oil Company, Philadelphia, Pa., a corporation of New Jersey
Filed Sept. 26, 1963, Ser. No. 311,784
3 Claims. (Cl. 339—94)

This invention relates to an electrical connector and particularly to a combined seal and connector assembly by means of which electrical interconnection may be provided between a large number of components located in regions having large pressure differentials.

In the field of high pressure measuring instruments, for example, it is often necessary to electrically interconnect a large number of components while maintaining a relatively great pressure differential therebetween. For example, in the bore hole pressure measuring instruments disclosed in the copending applications of Bennett, Chaney, Jones and Mayes, Serial Nos. 268,657 and 278,556, filed on March 28, 1963, and on May 7, 1963, it is necessary to electrically interconnect the pressure sensing portions of the instrument with a motorized section of the instrument wherein the former portion may be at a pressure in the order of 4,000 p.s.i., whereas, the latter section must be maintained at atmospheric pressure. In such applications, it is known to provide separate seals about individual lead wires for the purpose of preventing the leakage of pressurized fluid along the lead wires. However, the provision of separate seals for each wire becomes most difficult in those applications wherein it is necessary to seal a large number of lead wires within an instrument the total diameter of which cannot be greater than a few inches. For example, if the diameter of each wire seal is in the order of a quarter of an inch and the instrument requires sixteen of such wires it becomes extremely difficult to maintain the maximum diameter of the instrument within the range of two to three inches although the latter requirement is necessary in order for the instrument to be small enough to pass downwardly through a drill stem for the purpose of logging a bore hole while the drill stem is located therein.

It is therefore a principal object of the present invention to provide a high pressure seal and electrical connector assembly wherein a larger number of lead wires may be individually sealed within a substantially smaller space than has been possible with previous connectors.

This principal object and others more particularly relating to the details of construction and assembly will become more fully apparent from the following description when taken in conjunction with the accompanying drawings in which.

Figure 1:
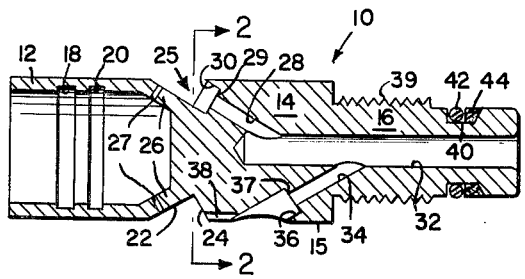
FIGURE 1 is a sectional view of a first portion of the connector assembly.
Figure 4:
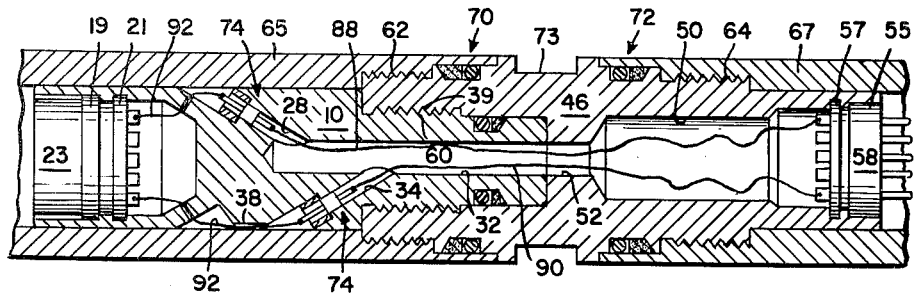
FIGURE 4 is a sectional view showing the portions of FIGURE 1 and FIGURE 2 in their assembled position.

Referring to FIGURE 1, the first portion of the assembly comprises a male coupling member 10 having a hollow cylindrical portion 12, a central portion 14 and a stem portion 16 of lesser diameter than the central portion 14. The internal surface of cylindrical portion 12 is provided with a pair of annular grooves 18 and 20 which are adapted to receive a pair of projecting flanges 19 and 21 provided on a female plug 23 as shown in FIGURE 4.

Between portions 12 and 14, member 10 is provided with an annular V-shaped groove 25 which forms a converging, conical surface 22 and an opposing diverging conical surface 24. The internal surface of portion 12 axially adjacent external surface 22 is tapered inwardly so as to provide a conical wall 26 through which there extend a plurality of passages 27. In the illustrated embodiment of the invention, it will be understood that there are sixteen passages 27 although it will be readily apparent that a lesser or greater number may be provided if desired.

Figure 2:
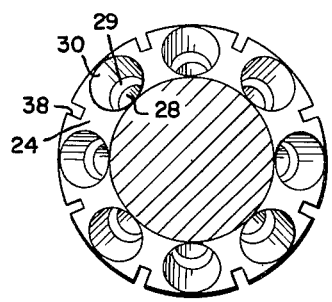
FIGURE 2 is a sectional view of the first portion of the assembly taken along the plane indicated by line 2—2 in FIGURE 1.

Referring now to FIGURES 1 and 2, portion 14 of member 10 is provided with eight passages 28 each of which terminates in a counterbore 30 opening to surface 24. As most clearly shown in FIGURE 2, passages 28 are equally spaced circumferentially about the central axis of member 10 and extend obliquely into portion 14 so that their inner ends communicate with an axial bore 32 extending throughout the axial length of stem portion 16 and partially through the axial length of portion 14.

A second set of oblique passages 34 is provided in portion 14 so that the internal ends of these passages are also in communication with central bore 32. The radially outer ends of passages 34 terminate in counterbores 36 each of which opens to the annular surface 15 of portion 14 and each of counterbores 36 is in communication with surface 24 through a slot 38 provided in surface 15.

The external surface of stem 16 is threaded at 39 and provided with an annular groove 40 the latter of which receives an O-ring 42 and a lead ring 44 which collectively form a high pressure seal of the type more fully disclosed in the copending application of Fred M. Mayes, Serial No. 254,135, filed on January 28, 1963.

Figure 3:
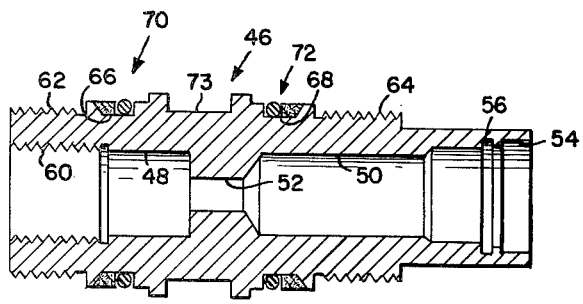
FIGURE 3 is a sectional view of a second portion of the connector assembly.

Referring now to FIGURE 3, the second portion of the connector assembly comprises a female coupling member 46 having axially aligned bores 48 and 50 interconnected by a reduced diameter bore 52. The right-hand end of bore 50 as viewed in FIGURE 3 is provided with a counterbore 54 and an annular groove 56 which are adapted to receive a cylindrical portion 55 and a flange 57, respectively, of a male plug 58 as shown in FIGURE 4.

As viewed in FIGURE 3, the left-hand end of bore 48 is threaded at 60 so as to receive threads 39 of coupling member 10. The external surface of member 46 is also threaded at 62 and 64 so as to threadedly receive a pair of outer casings 65 and 67 as shown in FIGURE 4. Between threaded portions 62 and 64, member 46 is provided with a pair of annular grooves 66 and 68 each of which receive an O-ring and a lead ring forming a first seal 70 and a second seal 72. Intermediate grooves 66 and 68, the external surface of member 46 is provided with a hexagonal surface 73 adapted to be engaged by a wrench.

Figure 5:
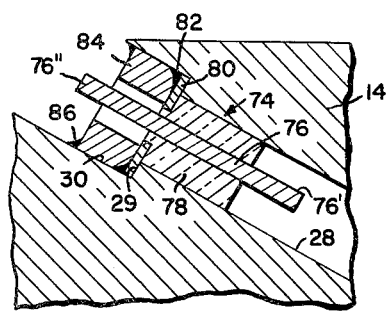
FIGURE 5 is an enlarged view of a portion of FIGURE 4.

Referring now to FIGURES 4 and 5, each one of passages 28 and 34 is adapted to receive an individual seal 74 of the known glass type which includes a centrally located conductive member 76 surrounded by and sealed within a glass body portion 78. Each one of seals 74 further includes an annular, metallic ring 80 which is bonded to body portion 78 and adapted to be received within either a counterbore 30 or 36 and soldered to one of the annular ledges 29 or 37 by a layer of solder 82. In order to provide additional mechanical strength so that repeated shocks and vibration during use of the instrument will not destroy the sealing action of solder 82, a metallic back-up ring 84 is inserted into each of counterbores 30 and 36 behind each seal 74 and soldered therein at 86.

The above described connector may be easily assembled as follows. An O-ring 42 and a lead ring 44 are first positioned in groove 40 whereupon stem 16 of member 10 is inserted into bore 48 of member 46 and the two members are rotated relative to each other so that threads 39 and 60 interengage thereby forming a fluidtight connection of the two members.

After members 10 and 46 are connected, eight lead wires 88 are individually passed through the eight passages 28 and a second set of eight wires 90 are individually passed through the eight passages 34, all sixteen wires passing through centrally aligned bores 32, 52 and 50 so as to extend outwardly of the right-hand end of member 46. The opposite end of each of the wires is then soldered to an end 76' of a conductive element 76. Each of seals 74 is then inserted into respective counterbores 30 and 36 with flanges 80 being soldered to ledges 29 and 37, respectively. Thereafter, a back-up ring is inserted in each of the counterbores and soldered therein as shown in FIGURE 5. The end of each of the wires extending outwardly of member 46 is then soldered to a terminal on plug 58 and the plug is snapped into position as shown in FIGURE 4, the excess length of wire being accommodated in large diametered bore 50 which is provided for this purpose.

Sixteen short lead wires 92 are then passed through passages 27 so that one end of each wire extends outwardly of the left-hand end of cylindrical portion 12 at which point each of the wires is soldered to a terminal of plug 23 and the plug is then snapped into position as shown in FIGURE 4. The free ends of eight of wires 92 are then soldered to ends 76" of the eight seal assemblies located in passages 28 while the other eight wires 92 are passed through grooves 38 and soldered to ends 76" of the eight seal assemblies located in passages 34. Lastly, seals 70, 72 are placed in grooves 66, 68 and casings 65, 67 are threadedly secured to member 46 with the aid of a wrench engaging surface 73.

From the foregoing description it will be apparent that the provision of axially spaced sets of passages 28 and 34 result in an improved distribution of the wire ends so that a greater number of wires and their individual seals may be contained within member 10 without increasing the diameter thereof. Of course, more than two axially spaced sets of passages may be provided within the scope of the invention and it is to be understood that the invention is not to be limited other than as specifically set forth in the following claims.

What is claimed is:

1. A combination seal and electrical connector assembly including an elongated member having first and second axially extending blind bores opening to opposite ends of said member, an annular groove in the exterior surface of said member axially positioned between said first and second bores, a plurality of ports extending between said first blind bore and said groove for permitting the passage of lead wires therebetween, a first set of transverse passages in said member, each of said transverse passages communicating at one end with said second blind bore and at the other end with said groove, a second set of transverse passages axially spaced from said first set, each of said passages of said second set communicating at one end with said second blind bore and at the other end with said exterior surface of said member, a plurality of axially extending grooves in said exterior surface extending between each of said transverse passages of said second set and said annular groove for permitting the passage of lead wires therebetween, and individual seal means positioned in each of said transverse passages for sealing respective lead wires extending therethrough.

2. A combination seal and electrical connector assembly comprising first and second elongated members, means for removably securing and sealing said first and second members in axially aligned relationship, said first member having an axial passage extending therethrough, a first plug positioned in one end of said passage remote from said second member, said second member having a pair of blind bores extending inwardly from opposite ends thereof, one of said bores being in communication with the other end of said passage, first and second sets of axially spaced transverse passages positioned in said second member, one end of each of said transverse passages communicating with said one blind bore, the other end of each of said transverse passages communicating with the exterior surface of said second member at a position axially between said blind bores, a first set of passage means extending between said first set of transverse passages and the other of said blind bores, a second set of passage means extending between said second set of transverse passages and the other of said blind bores, a second plug positioned in said other blind bore, a plurality of lead wires extending from said second plug through said first set of passage means, said first set of transverse passages and through said one blind bore to said first plug, a second plurality of lead wires extending from said second plug through said second set of passage means, said second set of transverse passages and through said one blind bore to said first plug, and seal means positioned in each of said transverse passages for sealing the respective lead wire extending therethrough.

3. A combination seal and electrical connector assembly comprising first and second elongated members, means for removably securing and sealing said first and second members in axially aligned relationship, said first member having an axial passage extending therethrough, a first plug positioned in one end of said passage remote from said second member, said second member having a pair of blind bores extending inwardly from opposite ends thereof, one of said bores being in communication with the other end of said passage, first and second sets of axially spaced transverse passages positioned in said second member, one end of each of said transverse passages communicating with said one blind bore, the other end of each of said transverse passages communicating with the exterior surface of said second member at a position axially between said blind bores, a first set of passage means extending between said first set of transverse passages and the other of said blind bores, a second set of passage means extending between said second set of transverse passages and the other of said blind bores, a second plug positioned in said other blind bore, a plurality of lead wires extending from said second plug through said first set of passage means, said first set of transverse passages and through said one blind bore to said first plug, a second plurality of lead wires extending from said second plug through said second set of passage means, said second set of transverse passages and through said one blind bore to said first plug, seal means positioned in each of said transverse passages for sealing the respective lead wire extending therethrough, casing means enclosing said assembly, and additional seal means positioned between said assembly and said casing means.

References Cited by the Examiner

UNITED STATES PATENTS

| 443,530 | 12/1890 | Lieb | 339—117 |
|---|---|---|---|
| 490,903 | 1/1893 | Gartland | 339—15 |
| 2,189,251 | 2/1940 | Potter | 339—182 |
| 2,297,828 | 10/1942 | Flatford | 339—94 |
| 2,645,759 | 7/1953 | Solari | 339—92 |
| 2,672,500 | 3/1954 | Bondon. | |
| 2,892,990 | 6/1959 | Werndl | 339—182 |

FOREIGN PATENTS

| 1,272,760 | 8/1961 | France. |
|---|---|---|
| 6,477 | 3/1897 | Great Britain. |
| 24,986 | 9/1903 | Great Britain. |
| 805,728 | 12/1958 | Great Britain. |

JOSEPH D. SEERS, *Primary Examiner.*